United States Patent [19]

Moule

[11] 3,889,013
[45] June 10, 1975

[54] METHOD FOR MAKING SKINLESS FOOD PRODUCTS

[76] Inventor: Rex E. Moule, 2404 S. Patrick Dr., Indialantic, Fla. 32903

[22] Filed: Mar. 21, 1973

[21] Appl. No.: 343,354

Related U.S. Application Data

[60] Continuation of Ser. No. 124,442, March 15, 1971, abandoned, which is a division of Ser. Nos. 674,309, Oct. 10, 1967, abandoned, and Ser. No. 155,271, June 21, 1971, abandoned.

[52] U.S. Cl. ............... 426/513; 426/212; 426/516; 17/49
[51] Int. Cl. ............................................. A22c 11/00
[58] Field of Search ............ 99/109, 352, 353, 355, 99/384, 441; 17/39; 219/10.55, 10.61; 426/245, 246, 247, 371, 382, 513, 212, 516

[56] References Cited
UNITED STATES PATENTS

| | | | |
|---|---|---|---|
| 1,980,875 | 11/1934 | Northrup | 219/10.61 X |
| 2,182,211 | 12/1939 | Paddock | 99/353 |
| 2,208,651 | 7/1940 | Wallace | 99/353 |
| 2,386,775 | 10/1945 | Balzarini | 99/353 UX |
| 2,575,068 | 11/1951 | Nanna | 99/353 |
| 2,953,461 | 9/1960 | Prohaska | 99/352 X |
| 3,052,915 | 9/1962 | Moller | 17/39 X |
| 3,163,542 | 12/1964 | Clemens | 99/352 X |
| 3,235,388 | 2/1966 | Francis | 99/109 |
| 3,421,434 | 1/1969 | Krachmer | 99/441 X |
| 3,502,018 | 3/1970 | Keszler et al. | 99/441 X |

FOREIGN PATENTS OR APPLICATIONS

| | | | |
|---|---|---|---|
| 957,179 | 1/1957 | Germany | 99/352 |
| 891,175 | 3/1962 | United Kingdom | 99/355 |

Primary Examiner—Raymond N. Jones
Assistant Examiner—R. A. Yoncoskie
Attorney, Agent, or Firm—James C. Wray

[57] ABSTRACT

A method for preparing cylindrical food products in units through a processing line comprising a pressure means and a flow control unit for conveying the food product through a preparation zone, a heating zone for heating the food product from the outer surface inwardly toward the center, and a cooling zone for solidifying the outer thickness to provide a casing that will contain the food mixture within each cylindrical unit.

1 Claim, 3 Drawing Figures

PATENTED JUN 10 1975  3,889,013

INVENTOR.
REX E. MOULE

BY

ATTORNEY

METHOD FOR MAKING SKINLESS FOOD PRODUCTS

This is a continuation of application Ser. No. 124,442 filed Mar. 15, 1971, now abandoned, which was a divisional application of Ser. No. 674,309 filed Oct. 10, 1967, now abandoned, which also had a divisional application Ser. No. 155,271 filed June 21, 1971, now abandoned. The priority of those applications is claimed.

BACKGROUND OF THE INVENTION

This invention relates to a new and improved method and apparatus for the continuous manufacture of skinless food products, and more particularly, for making cylindrical food units such as frankfurters and sausages.

As is perhaps well-known, many devices have been designated in an attempt to produce skinless frankfurters or sausages. In the past many processes have been proposed, without success, to provide smooth cylindrical frankfurters or sausages on a production bases by encasing the food mixture in itself.

SUMMARY OF THE INVENTION

A method and apparatus for preparing cylindrical food products encased in the food product itself. The method includes supplying and metering, under pressure, a food mixture to and transporting the food mixture through a cylindrical mold lying in the preparation zone. The preparation zone includes a heating and cooling zone. The heating zone heats the moving food mixture, from the outside in. The outer thickness of the food mixture is heated to a temperature that liquifies the fatty substances and that unites into a coherent mass the other ingredients of the mixture. The cooling zone thereafter cools the food substances in order to solidify the outer thickness into a casing for the cylindrical food product. The apparatus includes a pressurized food-stuffing device, a metering apparatus for controlling the flow of the food mixture through the preparation zone. The heating unit subjects the outer thickness of the food mixture, while under pressure, to heat, in order to liquify the fatty substances and unite into a coherent mass the other ingredients. The pressurized system transports the food mixture through the preparation zone and fills any voids created during liquification of the fatty substances or the uniting into a coherent mass the other ingredients. Thereafter the hot outer thickness of the food mixture is passed through the cooling unit to solidify the outer thickness in order to encase the food mixture.

It is an object of this invention to provide a method of producing skinless food products by passing the food mixture, under pressure and at a controlled flow rate, through a mold for first heating the food mixture from the outside in and thereafter cooling the food mixture to solidify the outer thickness of the food mixture to form a casing.

It is another object of this invention to provide a relatively high speed production line apparatus for manufacturing skinless food products such as frankfurters or sausages.

It is another object of this invention to provide a continuous extrusion apparatus that forms a cylindrical casing from the outer thickness of the food mixture in order to produce a self encased frankfurter or sausage.

It is a further object of this invention to provide a non-complex means for producing a cylindrical skinless frankfurter or sausage.

An additional object of this invention is to provide a smooth casing for each unit of a cylindrical frankfurter or sausage.

In accordance with these and other objects which will be apparent hereinafter, the instant invention will now be described with particular reference to the accompanying drawing.

THE DESCRIPTION OF THE DRAWING

A BRIEF DESCRIPTION OF THE PREFERRED EMBODIMENT

Figure 1:
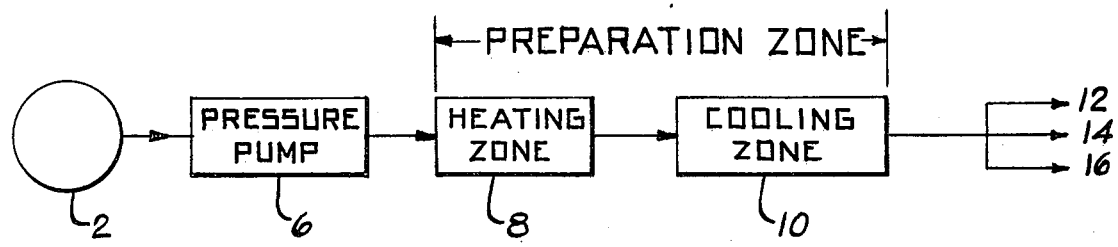
FIG. 1 is a blocked diagram showing the method of producing the skinless food product.

Referring now in detail to the drawing, wherein an embodiment of the invention is shown, and referring particularly to FIG. 1, shown in block diagram, the method of producing skinless food products in a continuous production line. A supply tank 2 is filled with a mixture of the food product. The supply tank 2 is pressurized to provide the motive means for transporting the food product through the system described hereinafter. The supply tank 2 may be filled from hoppers, now shown, and pressurized by well-known means, also not shown. The supply tank 2 or tanks supply the food mixture to the preparation zone, generally designated by numeral 4. A metering pump 6 is connected between the supply tank 2 and the preparation zone for providing a continuous pressure on the food mixture in order to uniformly transport the food mixture through the preparation zone. The preparation zone is divided into a heating zone 8 and cooling zone 10. The heating zone 8 heats the outer thickness of the food mixture from the outside in, at temperatures ranging from 200° to 500° Fahrenheit. When heat is applied to the outer surface of the mixture, the fatty particles liquify and the other ingredients are united into a coherent mass. The liquification or uniting tends to produce voids within the mixture because of contraction of the material during the heating process. Continuous pressure is kept on the food mixture to fill the voids with the mixture itself. Thereafter, the food mixture is passed under pressure into the cooling zone 10 where the outer thickness of the food mixture is cooled to solidify the outer thickness into a casing for the food product itself.

The food product discharged from the preparation zone may be conveyed to a variety of processing lines in order to further process the food product, such as linking, curing, smoking or cutting the product into various lengths. The various processes to which the food product may be passed after it is discharged from the cooling zone 10 are shown by arrows numbered 12, 14 and 16. Arrow 12 indicated that the food product passes to a linker and thereafter to a zone for curing and smoking the product. The product may be passed to an assembly line 14 containing only a zone for curing and smoking. The food product may be passed along to assembly 16 for cutting the product into desired lengths. Therefore, the new and improved apparatus may be placed in well-known assembly lines.

The thickness of the casing depends on three basic variables. First, the pressure placed on the food mixture, which controls the flow rate through the preparation zone, second, the heat supplied by the heating zone, and third, the cooling supplied by the cooling zone. These variables provide enough control to allow a single apparatus to be used for various mixtures of the food ingredients that are provided to make linked food products.

Figure 2:
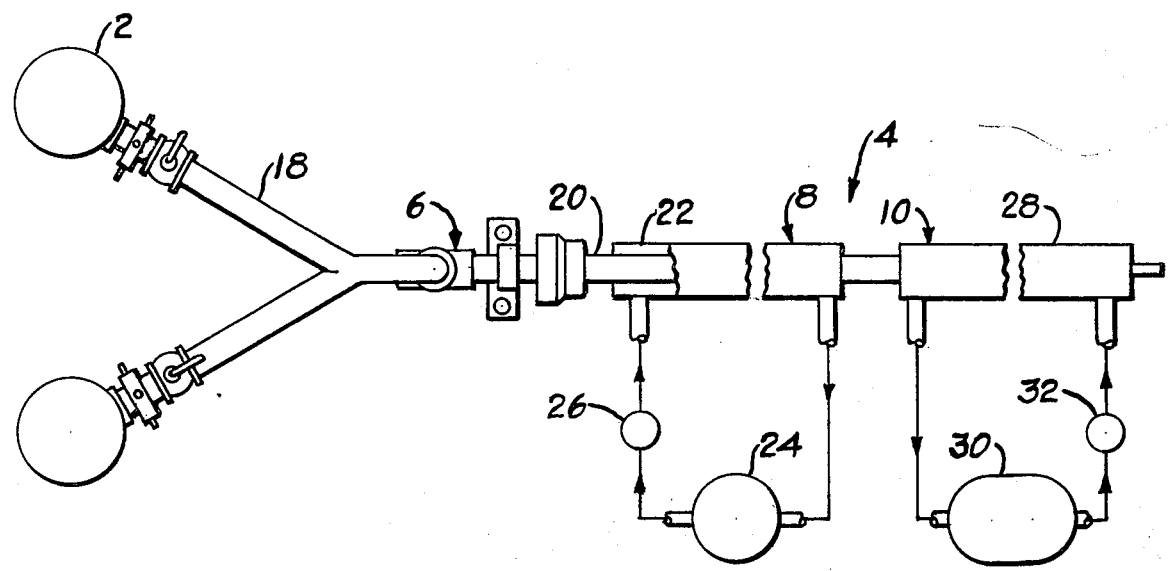
FIG. 2 is a plan view of the apparatus.

Now referring to FIG. 2, showing a preferred embodiment of the present invention. The supply tanks or pressurized stuffers 2, are connected to a pressure pump 6 by lines 18. The supply tanks 2 are preferably under a pressure of 150 to 300 pounds per square inch. The pressure pump 6, such as a Moyno pump, is capable of delivering the food mixture at 150 to 300 pounds per square inch to the preparation zone. The preparation zone includes a cylindrical mold 20 having the shape of the desired final product. The mold 20 is made of metal or other suitable material to be used as a heat transfer means. The inside surface of the mold 20 is preferably coated with film of a low friction material, such as a fluorocarbon resin. A highly polished metal surface may be usable if the coefficient of friction is low enough to allow the body of the food mixture to pass through the mold along with the outer thickness of the mixture as it is being formed into the casing. The outer thickness of the mixture must move along with the central body portion of the mixture.

The heating zone includes a jacket 22 that provides means for hot oil to be placed in contact with the mold 20. The mold transfers the heat supplied by the 40,000 BTU heater by way of the jacket 22 and pump 26 to the food product. The oil is supplied to the jacket at a temperature between 170 to 500° Fahrenheit. The flow rate of the mixture and the length of the heating zone will govern the temperature of the outer thickness of the food mixture as it passes from the heating zone. Other types of heaters may be utilized, such as induction heating of the mold 20 when a metallic tube is used. The tube will heat the mixture from the outside in, as set forth hereinabove.

The cooling zone may include a jacket 28 providing a means for bringing the coolant into contact with the mold 20. The coolant is supplied from a three horsepower ethylene gycol cooler 30 at between 33 to 50° Farenheit. The pump 32 feeds the coolant through the system.

The same basic method may be accomplished by using an ejection mold apparatus. The mold would be alternately heated and cooled under pressure to form the casing.

Figure 3:
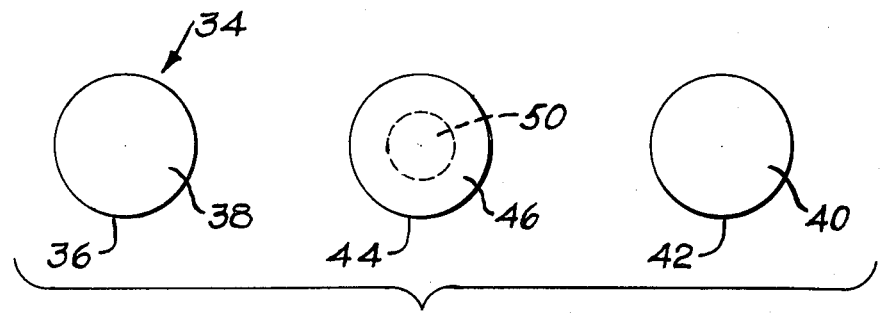
FIG. 3 is a cross-sectional view of various food products.

The preferred embodiment of the food product emitted from the cooling zone is shown as numeral 34 in FIG. 3 having a casing 36 approximately 0.010 to 0.030 inches in thickness. The central portion 38 of the food product is a soft, uncoagulated mixture. This embodiment is formed by passing the food mixture at a relatively high rate of speed through the heating zone to the cooling zone before the heat penetrates the body of the food mixture. This particular embodiment may be divided into units by various linking devices. The linking devices can connect fasteners at desired intervals along the food product and tighten the fasteners about the casing. The casing may be twisted in order to remove the soft mixture from the linking area. The soft mixture may be removed by pressure and the casing joined into a cord like member by subjecting the casing to heater and cooling means to form the cord member by the same method described hereinabove.

A variety of embodiments of the food product may be formed as the food mixture is passed through the preparation zone. The central body portion of the food product may be cured to provide a coagulated central portion 40 with casing 42, as shown in FIG. 3. The heat is allowed to penetrate the entire diameter of the food mixture as it passes through the heating zone. Any intermediate form may be made by controlling the flow rate of the material through the heating zone, that is, the length of time the material is subjected to the heat in the heating zone. The casing 44 surrounds a zone of cured portion 46 which in turn surrounds a soft, uncoagulated center portion 50.

In use the food mixture is pushed under pressure through the mold 20, the combination of the heat and pressure in the interior of the smooth mold 20 causes the outer thickness of the mixture to become at least partly cooked and forms a smooth outer surface. The degree to which the food product may be cooked in this area of the device depends upon the length of the process or the kind or degree of heat involved.

After the food product has been heated as stated, it is pushed in cylindrical form through the mold 20, by means of the pump 6 and thereafter through a cooled area 10 and after cooling the product under pressure it is deposited on a conveyor mechanism, not shown.

It is pointed out that in cooking a mixture of the class contemplated herein, the mere application of heat to the product will cause voids in the surface thereof, giving an imperfect product, this being due to the presence of fat particles on the surface which melt. The pressure from the pump however, causes the voids to be filled by the emulsion or mixed particles and thus a smooth, even coagulated surface is provided. When the product is cooled, it retains a "skin like" texture. However, actually there is no foreign skin and the product is self-sustaining, and ready for further cooking, smoking, or other processing.

The instant invention has been shown and described herein in what is considered the most practical and preferred embodiment. It is recognized, however, that departures may be made therefrom within the scope of the invention. The invention is therefore not to be limited to the details disclosed herein but to be accorded the full scope of the claims so as to embrace any and all equivalent apparatus and articles.

What is claimed is:

1. A method of continuously making a skinless sausage food product from a sausage food mixture comprising the steps of:
   ejecting the sausage food mixture from a pressurized supply tank into a pressurizing and metering pump;
   injecting the untreated sausage food mixture under a pressure from 150 – 300 pounds per square inch into the inlet end of a thermally conductive conduit under pressure from a pressurizing and metering pump;
   moving the sausage food mixture at a high rate of speed through the thermally conductive conduit;
   passing the food mixture at a high rate of speed through the heated first portion;

simultaneously heating a first portion of the thermally conductive conduit adjacent the inlet end of said conduit to a temperature between 200° to 500° Fahrenheit, thereby heating a surface portion of the sausage food mixture to a temperature that liquifies fatty substances on a surface and that unites into a coherent mass other ingredients in a surface portion, while keeping continuous pressure on the food mixture to fill voids with the mixture itself;

cooling a second portion of said conduit adjacent said heated portion and axially in line with the flow of said food mixture to a temperature between 33° and 50° Fahrenheit, thereby cooling the sausage food mixture before heat penetrates inward beyond the surface portion, whereby the surface portion of the food mixture is cooled to solidify the outer thickness into a casing for the food product;

ejecting the food mixture from the outlet end of said conduit whereby a sausage food mixture is continuously transformed into a skinless food product.

* * * * *